United States Patent [19]

Bell

[11] Patent Number: 5,710,432
[45] Date of Patent: Jan. 20, 1998

[54] NON-CONTACT TENSION MEASUREMENT OF MOVING FIBER USING TRAVELING WAVE TIME-OF-FLIGHT ANALYSIS

[75] Inventor: David G. Bell, Newton, N.C.

[73] Assignee: Alcatel NA Cable Systems, Inc., Claremont, N.C.

[21] Appl. No.: 588,555

[22] Filed: Jan. 18, 1996

[51] Int. Cl.$^6$ .............................. G01N 21/00; G01L 5/10; C03B 3/07
[52] U.S. Cl. ........................... 250/559.32; 356/73.1; 73/862.41; 73/160; 364/469.01; 65/486
[58] Field of Search .................... 250/559.32, 559.29, 250/231.1, 227.11, 216; 356/73.1, 32; 73/862, 391, 862.41, 862.42, 862.44, 862.59, 159, 160; 364/469.01, 470.13, 472.08; 65/486, 485, 484, 479, 476, 475

[56] References Cited

U.S. PATENT DOCUMENTS

| | | | |
|---|---|---|---|
| 3,989,069 | 11/1976 | Hrdina et al. | 139/436 |
| 4,294,545 | 10/1981 | Stutz . | |
| 4,376,368 | 3/1983 | Wilson . | |
| 4,445,322 | 5/1984 | Satterfield . | |
| 4,692,615 | 9/1987 | Mensah et al. . | |
| 4,833,928 | 5/1989 | Luukkala et al. . | |
| 5,079,433 | 1/1992 | Smith . | |
| 5,113,708 | 5/1992 | Bode et al. . | |
| 5,228,893 | 7/1993 | Smithgall et al. . | |
| 5,233,200 | 8/1993 | DiMarcello et al. . | |
| 5,316,562 | 5/1994 | Smithgall et al. . | |
| 5,359,904 | 11/1994 | Luukkala . | |
| 5,454,272 | 10/1995 | Miller et al. | 73/562.41 |

*Primary Examiner*—Edward P. Westin
*Assistant Examiner*—John R. Lee
*Attorney, Agent, or Firm*—Ware, Fressola, Van Der Sluys & Adolphson LLP

[57] ABSTRACT

The invention provides an optical fiber producing apparatus having non-contact fiber tension monitoring, comprising: a traveling wave wavelet transformation processor and a time-of-flight fiber tension processor. The traveling wave transformation processor responds to a fiber transverse position processor signal representing information relating to a traveling wave propagating in one direction along a moving fiber and a reflection of the traveling wave propagating back in an opposite direction along the moving fiber, and provides a traveling wave transformation processor signal. The time-of-flight fiber tension processor responds to the traveling wave transformation processor signal, and further responsive to a fiber draw speed signal, and provides a time-of-flight fiber tension processor signal indicative of a fiber tension of the moving fiber using traveling wave time-of-flight analysis. The optical fiber producing apparatus performs non-contact fiber tension monitoring using a physical description of the fiber motion which accurately accounts for the fact that the fiber is moving, particularly at a high rate of speed, which has an influence on the time-of-flight of traveling waves propagating on the fiber. The non-contact fiber tension monitoring is extremely accurate at high fiber speeds.

11 Claims, 5 Drawing Sheets

5,710,432

NON-CONTACT TENSION MEASUREMENT OF MOVING FIBER USING TRAVELING WAVE TIME-OF-FLIGHT ANALYSIS

TECHNICAL FIELD

This invention relates to an optical fiber producing apparatus for non-contact tension monitoring of a moving fiber; and more particularly, relates to the non-contact tension monitoring of the moving optical fiber using traveling wave time-of-flight analysis.

BACKGROUND OF THE INVENTION

During the manufacture of certain fibers, yarns, ribbons, and belts, it is necessary to apply tension force, for example by pulling, in order to produce the fibers, yarns, ribbons, and belts. Many different ways are known in the art to measure and monitor tension on a moving fiber without contacting it. The following is a brief description of four different techniques known in the prior art.

Various patents are known that perform non-contact monitoring using an air jet to cause vibration and analyzing the resonant frequency of a standing wave. For instance, U.S. Pat. Nos. 5,113,708, 4,445,322 and 4,376,368 involve using an air jet to vibrate yarn at its harmonic frequency, and an infrared photo detector to measure harmonic frequency to determine tension. In particular, a steady stream of air vibrates specifically a piece of yarn at its harmonic frequency, determines the vibrating yarn's harmonic frequency, and relates that harmonic frequency to the yarn tension using established methods for standing wave analysis.

U.S. Pat. Nos. 5,079,433 and 4,692,615 teach methods that analyze the resonant frequency of natural vibrations in a standing wave. These patents require only the natural vibration of the fiber, and do not use any method to further act on the motion of the fiber or expose the fiber to potential contact with additional, close proximity devices.

In addition, U.S. Pat. Nos. 5,316,562 and 5,228,893 use a series of air "puffs" with their frequency modulated to match specifically the resonant frequency of an optical fiber. When the x-y motion of the fiber at the detector achieves a maximum deviation indicating that the air puff frequency matches the harmonic frequency, the air puff frequency is taken to be the harmonic frequency of the fiber, and the tension is derived as in the approach of U.S. Pat. Nos. 5,113,708, 4,445,322 and 4,376,368. In particular, U.S. Pat. Nos. 5,316,562 and 5,228,893 use an air jet to vibrate specifically a stationary grid element, then derive tension from the resonant frequency, as discussed above.

U.S. Pat. No. 5,233,200 teaches an offset method that is different than the aforementioned methods, and uses a steady air stream of a known cross section and velocity to deflect specifically from a straight line the path of an optical fiber, and derives the tension on the fiber from the magnitude of the deviation from the normal axis of the optical fiber, and makes no use of the fiber vibration characteristics.

U.S. Pat. Nos. 5,359,904 and 4,833,928 teach a method of non-contact measurement that subjects a fiber under tension with an acoustic pulse in order to induce a wave impulse, whose velocity through the medium can be measured. In the specific fiber optic application, the velocity of the imparted acoustic pulse is determined by measuring the time delay between sensing the pulse at two discrete locations, once in the direction coincident with the motion of the fiber, and again in the opposite direction, and using an average of the two as the propagation velocity (thereby eliminating the effect of the fiber speed).

The primary shortcoming shared by the methods described in U.S. Pat. Nos. 5,113,708, 4,445,322, 4,376,368, 5,079,433 and 4,692,615, using standing wave analysis, is the treatment of the fiber transverse motion as standing waves (a "vibrating fixed string" approach), rather than counter-propagating waves in a fiber in drawing motion. This simplifying assumption creates a significant and predictable inaccuracy of the estimate of fiber tension that increases monotonically with draw speed. Generally, higher draw speeds are economically advantageous, and as the fiber drawing tension is a critical process parameter that affects the quality and yield of the resulting product, it is very advantageous to employ a non-contact method that is accurate at all speeds, particularly very high speed. Furthermore, these methods of non-contact measurement are also complicated with increasing spans, in that the harmonic frequency will drop and potentially become confounded with sub-sonic background and building vibration. Increasing spans are normally required at high draw speeds in the manufacture of optical fiber.

The methods described in U.S. Pat. Nos. 5,113,708, 4,445,322, 4,376,368, 5,233,200, 5,359,904 and 4,833,928, share a common shortcoming in that they all require inducing synthetic x-y motion into the filament using a means of gas pressure via flow or acoustic impulse. Essentially, they are not "non-contact" in its purest sense, in that a local gas is used to act on the fiber, rather than conventional "contact" methods that utilize mechanical means. In contrast, optimal conditions for the production of optical fiber are generally known to aspire to true non-contact for strength reasons (the raw fiber is uncoated and extremely susceptible to damage by either entrained particulate or inadvertent contact with the acoustic speaker or gas jet devices). Also, as the optical fiber is passed immediately into a viscous liquid coating device whose objective is to uniformly and concentrically coat the optical fiber with a protective coating, it is advantageous to minimize the transverse motion of the fiber as it enters the coating device.

SUMMARY OF THE INVENTION

The invention provides an optical fiber producing apparatus having non-contact fiber tension monitoring, comprising a traveling wave wavelet transformation processor and a time-of-flight fiber tension processor.

In the optical fiber producing apparatus of the present invention, the traveling wave wavelet transformation processor responds to a fiber transverse position processor signal representing information relating to a traveling wave propagating in one direction along a moving fiber and a reflection of the traveling wave propagating back in an opposite direction along the moving fiber, and provides a traveling wave wavelet transformation signal that is a wavelet representation of a resulting transverse motion of the moving fiber.

The time-of-flight fiber tension processor responds to the traveling wave wavelet transformation signal, and provides a time-of-flight fiber tension processor signal indicative of a fiber tension of the moving fiber using traveling wave time-of-flight analysis.

One significant feature of the invention that is very different than the methods described in the prior art patents described above is that the optical fiber producing apparatus performs non-contact fiber tension monitoring using a physical description of the fiber motion which accurately accounts for the fact that the fiber is moving, particularly at a high rate of speed, which has an influence on the time-of-flight of traveling waves propagating on the moving fiber.

One significant advantage of the invention over the methods described in the prior art patents mentioned above is that the non-contact fiber tension monitoring remains extremely accurate at high fiber speeds.

Other objects of the invention will in part be obvious and will in part appear hereinafter.

Accordingly, the invention comprises the features of construction, combination of elements, and arrangement of parts which will be exemplified in the construction hereinafter set forth, and the scope of the invention will be indicated in the claims.

A DESCRIPTION OF THE DRAWING

For a fuller understanding of the nature of the invention, reference should be made to the following detailed descriptions taken in connection with the accompanying drawings, not in scale, in which.

BEST MODE FOR CARRYING OUT THE INVENTION

General Considerations

Figure 1:
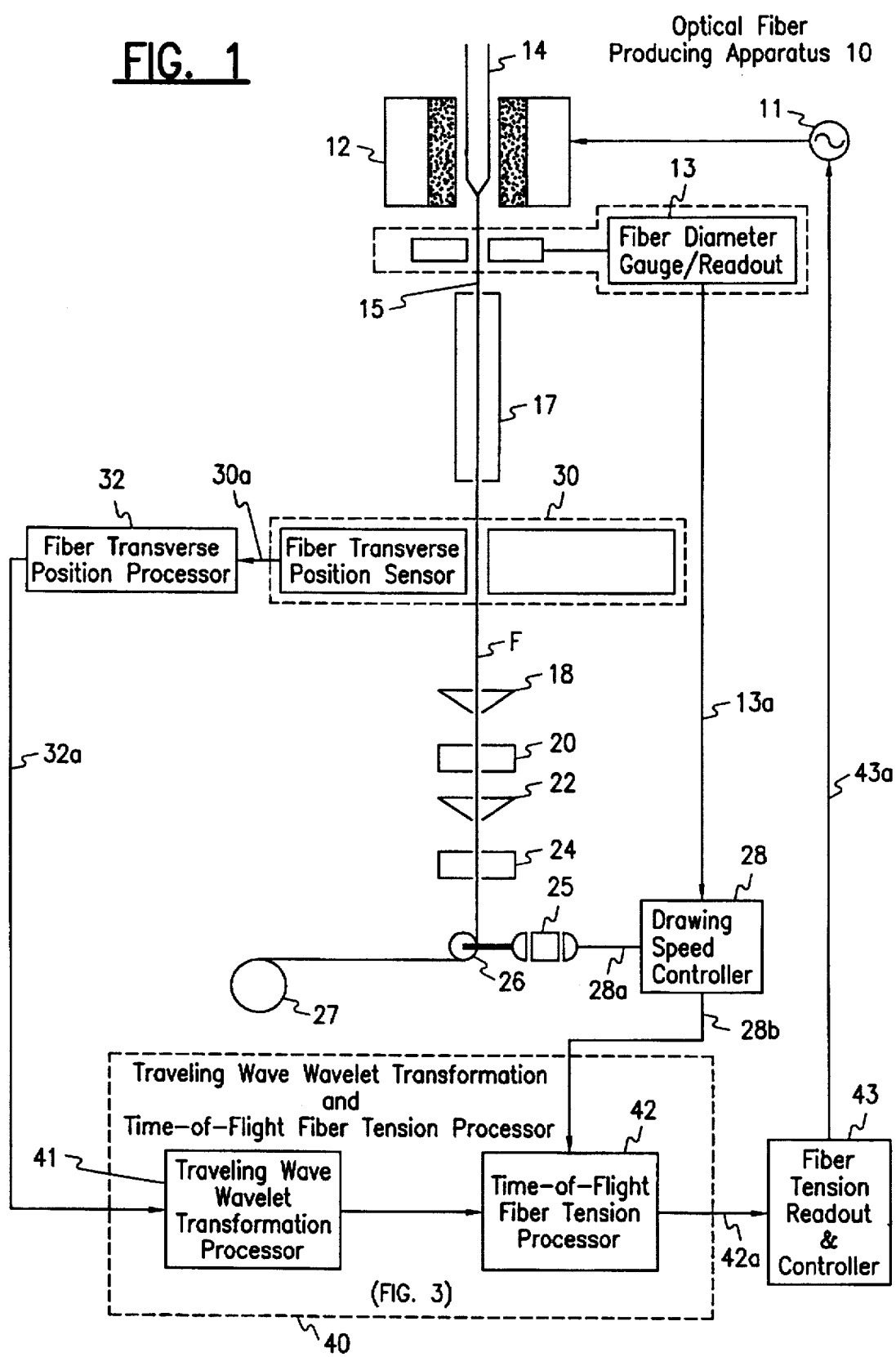
FIG. 1 is a block diagram of an optical fiber producing apparatus 10 of the present invention.

Generally, during the manufacture of a fiber optic cable, a glass optical fiber when drawn is a close approximation to a linear, isotropic, inelastic, constant density medium for wave propagation consideration. Thus the one dimensional wave equation may be solved by separation of variables, yielding a mathematically tractable description for the propagation of constant shape disturbances. Application of the conventional fixed boundary conditions, as in the prior art patents, produces the familiar relationship for the so-called resonant frequencies of the stretched string. These methods predict the tensile force if the linear density (mass per unit length) and the observed resonant frequency are known. This foregoing analysis applies for small transverse displacements of the string, since large displacements would introduce appreciable strain in the string, resulting in longitudinal elastic waves. The coupling of the transverse and longitudinal phenomena produces a considerably more complex mathematical formulation. The interpretation of the resonant frequency relationship depends upon a concept colloquially known as the standing wave, though the term is itself oxymoronic. A 'standing' wave is in reality the result of two or more counter- propagating waves which have to some extent constructively interfered with one another in their encounter; a wave, as mathematically described in the prior art patents and in the present application, is always a propagating phenomenon.

Next, one should consider a fiber in the draw at a non-zero drawing speed, in which some disturbance results in measurable motion in a plane normal to the draw axis. The disturbance (wave) thus propagates along the fiber axis until it (the wave) encounters a boundary (such as a coating applicator). If such a boundary does not completely dissipate the disturbance, then some of the disturbance energy will be reflected and propagate in the opposite direction until another boundary is encountered (such as the preform root), and the propagation process thus continues.

However, since the fiber is translating with respect to the wave reflecting boundaries, then the boundaries as observed by the wave appear to be in motion along the axis of propagation; in other words, the propagation distance appears to the disturbance to be shorter in the direction of the fiber translation and longer in the direction opposite of the fiber translation. Or, in the reference frame of a fixed observer such as a translational position sensor, the same pulse passing by the sensor concurrent with the axial direction of the moving fiber will be observed for a shorter time than the reflected wave as it returns traveling in the direction countercurrent to the direction of the fiber movement. When this concept is mathematically introduced into the wave equation boundary conditions, a solution is obtained which predicts the fiber tension as a function of linear density, propagation periods (not to be confused with conventional resonant frequencies), and the draw speed. In fact, the transverse vibration characteristics of a fiber in the draw depend on the relationship between the draw speed and the wave propagation speed, which is an important difference between the invention and the prior art patents.

In the discussions that follow, the term "wave" shall be interpreted in the classical physical sense, that is as a propagating phenomenon, not to be confused with a so-called stationary phenomenon "standing wave".

DETAILED DESCRIPTION OF THE INVENTION

FIG. 1 shows an optical fiber producing apparatus 10 for producing optical fiber, that includes a draw furnace 12 for heating a preform root 14 from which an optical fiber F is drawn. The fiber is drawn through a fiber diameter/gauge readout 13, a fiber cooling device 17, a first coating application 18, a first cure irradiator 20, a second fiber coating device 22, a second cure irradiator 22, around a fiber pull wheel 26 to a fiber take-up winding system 27. The fiber diameter/gauge readout 13 provides a fiber diameter/gauge readout signal 13a. A draw speed controller 28 responds to the fiber diameter/gauge readout signal 13a, and provides a fiber draw speed control signal 28a and a fiber draw speed signal 28b. A fiber pulling servo drive system 25 responds to the fiber draw speed control signal 28a, for adjusting the speed of the fiber pull wheel 26. The draw furnace 12, the fiber diameter/gauge readout 13, the fiber cooling device 17, the first coating application 18, the first cure irradiator 20, the second fiber coating device 22, the second cure irradiator 22, the fiber pulling servo drive system 25, the fiber pull wheel 26, the fiber take-up winding system 27, and the draw speed controller 28 are all known in the art, and the scope of the invention is not intended to be limited to any particular implementation thereof.

The Non-Contact Fiber Tension Monitoring System

The optical fiber producing apparatus 10 features a new and useful way for non-contact fiber tension monitoring, and includes a fiber transverse position sensor 30, a fiber transverse position processor 32 and a traveling wave wavelet transformation and time-of-flight fiber tension processor 40.

The traveling wave wavelet transformation and time-of-flight fiber tension monitoring processor 40 is the principal focus of the present invention.

The Fiber Transverse Position Sensor 30

The fiber transverse position sensor 30 senses the transverse position of the moving fiber F, and provides a fiber transverse position sensor signal 30a. The fiber transverse position sensor 30 is typically located between the draw furnace 12 and the first coating device 18. The fiber transverse position sensor 30 operates in two orthogonal axes such that the vector motion of the moving fiber F may be derived. Since the moving fiber F is drawn by the fiber drawing device 10 at high speed, naturally occurring disturbances are introduced onto the moving fiber, thus causing the moving fiber to vibrate transversely with respect to the draw axis of the fiber, resulting in various traveling waves propagating up and down the moving fiber F. Each traveling wave that propagates in one direction down the fiber F is reflected and propagated in an opposite direction up the fiber F. The fiber transverse position sensor 30 is known in the art, and is typically a photodiode array; however, the scope of the invention is not intended to be limited to either any particular type thereof, the number of optical fiber position detection devices, or the location thereof relative to the moving fiber F.

The Fiber Transverse Position Processor 32

The fiber transverse position processor 32 responds to the fiber transverse position sensor signal 30a, for providing a fiber transverse position processor signal 32a, which contains information relating to a traveling wave propagating in one direction along the moving fiber F and a reflection of the traveling wave propagating back in an opposite direction along the moving fiber F. This device acquires a fiber image signal from the fiber transverse position sensor 30, processes the image signal such that the fiber transverse position can be precisely determined in two orthogonal axes, then computes a motion vector of the moving fiber F using a fiber position record stored in memory (not shown) so determined. The scope of the invention is not intended to be limited to any particular implementation of the fiber transverse position processor 32.

Figure 2:
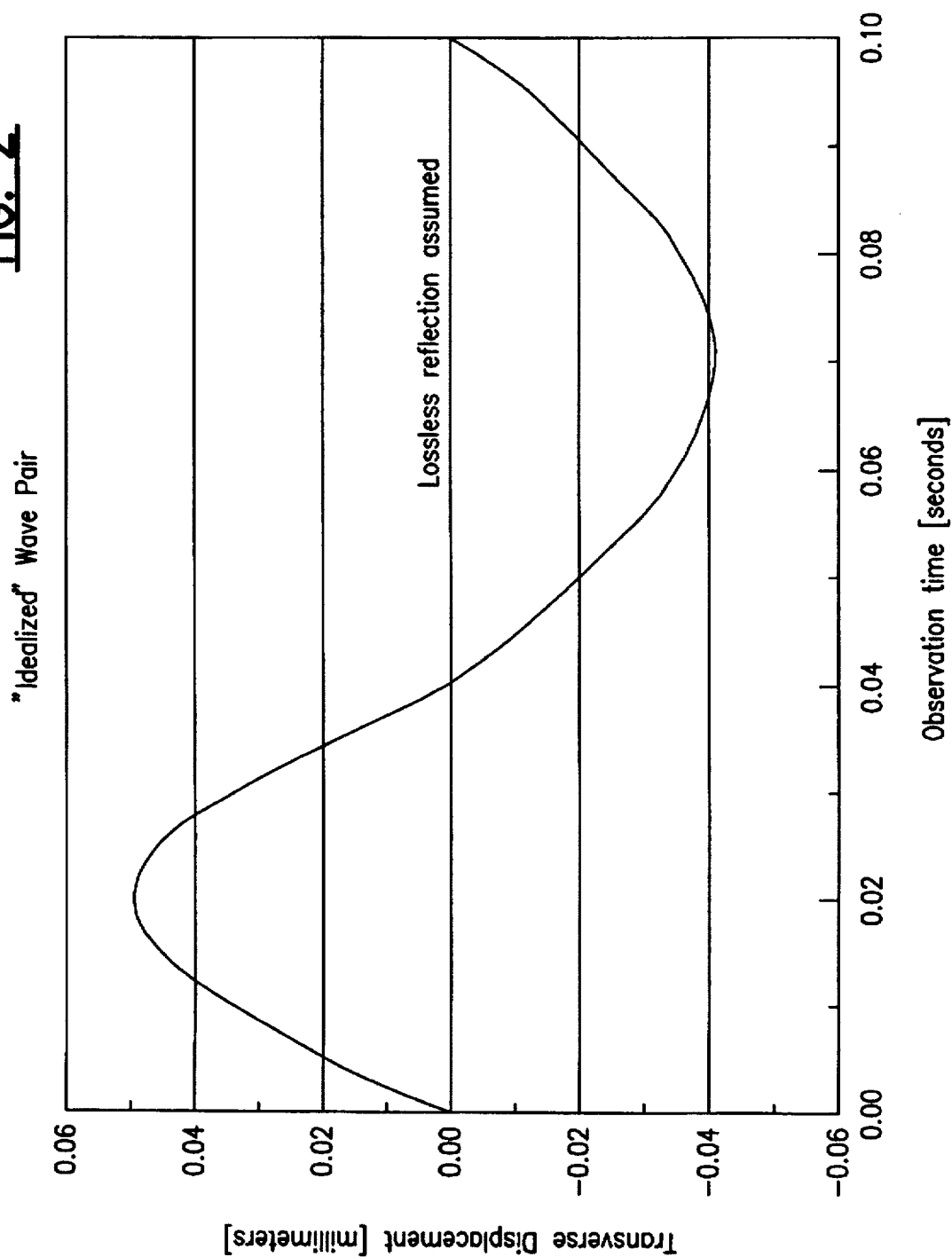
FIG. 2 is a graph of amplitude of sensed traveling waves in millimeters as a function of time in seconds.

FIG. 2 is a graph of amplitude of sensed traveling waves in millimeters as a function of time. FIG. 2 comprises an idealized representation of the transverse position in one axis of a fiber propagating a unipolar disturbance which has been ideally propagated and reflected, such that the disturbance energy has been conserved as it passes the fiber transverse position sensor 30 with and against the direction of fiber draw. This is an idealized representation, intended for illustrative purposes only in connection with the proposed concepts, and is not typical of signals available in actual fiber processing.

The Traveling Wave Wavelet Transformation and Time-of-flight Fiber Tension Processor 40

Figure 3:
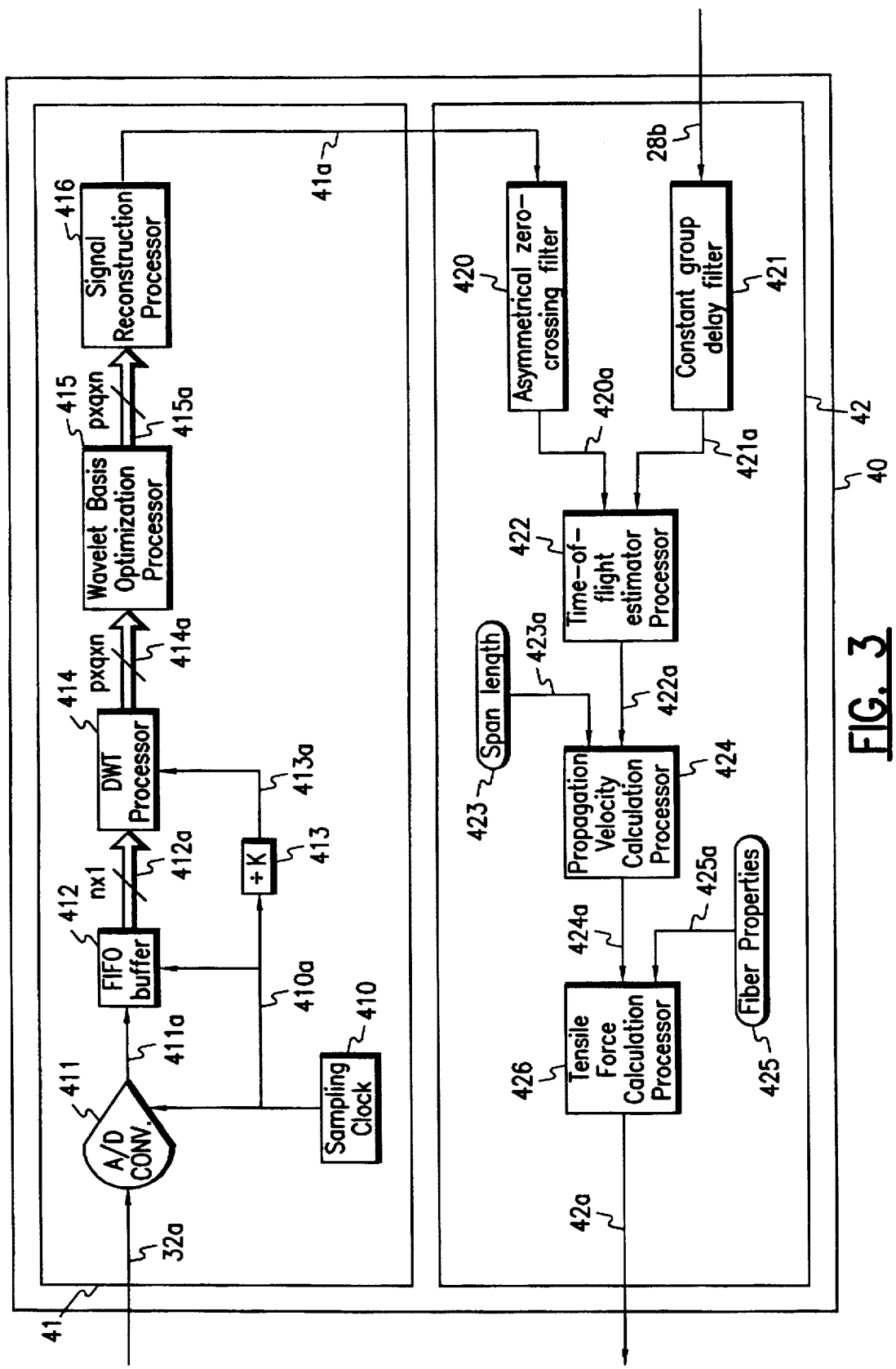
FIG. 3 shows an embodiment of a traveling wave wavelet transformation and time-of-flight processor 40 of the present invention.

As shown in FIG. 2, the traveling wave wavelet transformation and time-of-flight fiber tension processor 40 responds to the fiber transverse position processor signal 32a, and further responds to the fiber draw speed signal 28b, and provides a traveling wave wavelet transformation and time-of-flight fiber tension processor signal 42a indicative of a fiber tension of the moving fiber F using traveling wave time-of-flight analysis. As shown in FIGS. 2 and 3, the traveling wave wavelet transformation and time-of-flight fiber tension processor 40 includes a traveling wave wavelet transformation processor 41 and a time-of-flight fiber tension processor 42, both discussed in detail below.

In operation, when the traveling wave wavelet transformation processor 41 matches corresponding wavelet transformation signals, then the time-of-flight fiber tension processor 42 determines a difference in propagation times for these impulses in alternate directions, which is converted into a wave propagation velocity. Knowing the traveling wave propagating velocity and the material properties of the fiber F, the fiber tension can be determined by known methods.

The Traveling Wave Wavelet Transformation Processor 41

In particular, the traveling wave wavelet transformation processor 41 responds to the fiber transverse position processor signal 32a, and provides a traveling wave wavelet transformation signal 41a indicative of a wavelet transform of the traveling wave on the moving fiber F.

In the embodiment shown in FIG. 3, the traveling wave wavelet transformation processor 41 includes a sampling clock 410 for providing a sampling clock signal 410a. Such sampling clocks are known in the art. An analog-to-digital converter 411 responds to the sampling clock signal 410a, for providing an analog-to-digital converter sensed traveling wave signal 411a indicative of a conversion of an analog sensed traveling wave signal into a digital sensed traveling wave signal. Such an analog-to-digital converter is known in the art. A first-in/first-out buffer 412 responds to the sampling clock signal 410a, and further responds to the analog-to-digital converter sensed traveling wave signal 411a, and provides an n-bit-by-1-sample first-in/first-out buffer signal 412a indicative of an n-bit-by-1-sample buffer signal read on a first-in/first-out (FIFO) basis. A sampling clock divider circuit 413 responds to the sampling clock signal 410a, divides it by a factor of k, and provides a sampling clock divider signal 413a indicative of a divided sampling clock signal. Such a sampling clock divider circuit is known in the art. A discrete wavelet transform processor 414 responds to the n-bit-by-1-sample first-in/first-out buffer signal 412a, and further responds to the sampling clock divider signal 413a, and provides a p-sample-by-q-scale-by-n-bit discrete wavelet transform processor signal 414a indicative of a p-sample-by-q-scale-by-n-bit discrete wavelet transform of the traveling wave propagating in one direction along the moving fiber and a reflection of the traveling wave propagating back in the opposite direction along the moving fiber. A wavelet basis optimization processor 415 responds to the p-sample-by-q-scale-by-n-bit discrete wavelet transform processor signal 414a, and provides a p-sample-by-q-scale-by-n-bit wavelet basis optimization processor signal 415a indicative of an optimized p-sample-by-q-scale-by-n-bit discrete wavelet transform processor signal. The terminology 'wavelet basis optimization' generically describes the conditioning and selection operations that accompany wavelet analysis of uniformly sampled signals, and the mathematics of the wavelet analysis are known in the art. A signal reconstruction processor 416 responds to the p-sample-by-q-scale-by-n-bit wavelet basis optimization signal 415a, and provides the traveling wave wavelet transformation processor signal 41a in the form of a reconstruction processor signal indicative of a reconstruction of the optimized p-sample-by-q-scale-by-n-bit discrete wavelet transform processor signal. The discrete wavelet transform processor 414, the wavelet basis optimization processor 415 and the reconstruction processor 416 may be implemented as microprocessor software using a standard microprocessor architecture, including a microprocessor, a read only memory (ROM), a random access memory (RAM), and a data and address bus for connecting these components, which are all known in the art. The mathematics of the wavelet analysis for such processors are known in the art. The scope of the invention is not intended to be limited to any particular implementation of the sampling clock 410, the analog-to-digital converter 411, the first-in/first-out buffer 412, the sampling clock divider circuit 413, the discrete wavelet transform processor 414, the wavelet basis optimization circuit 415, and the reconstruction circuit 416, each of which may be implemented using hardware, software, or any combination thereof.

In the embodiment shown in FIG. 3, the discrete wavelet transform processor 414 uses wavelet transformations for optimizing a wave shape of a superposition of a disturbance and an associated reflection thereof such that propagation periods, also known as time-of-flight, to accurately determine both the disturbance and the associated reflection.

Figure 5:
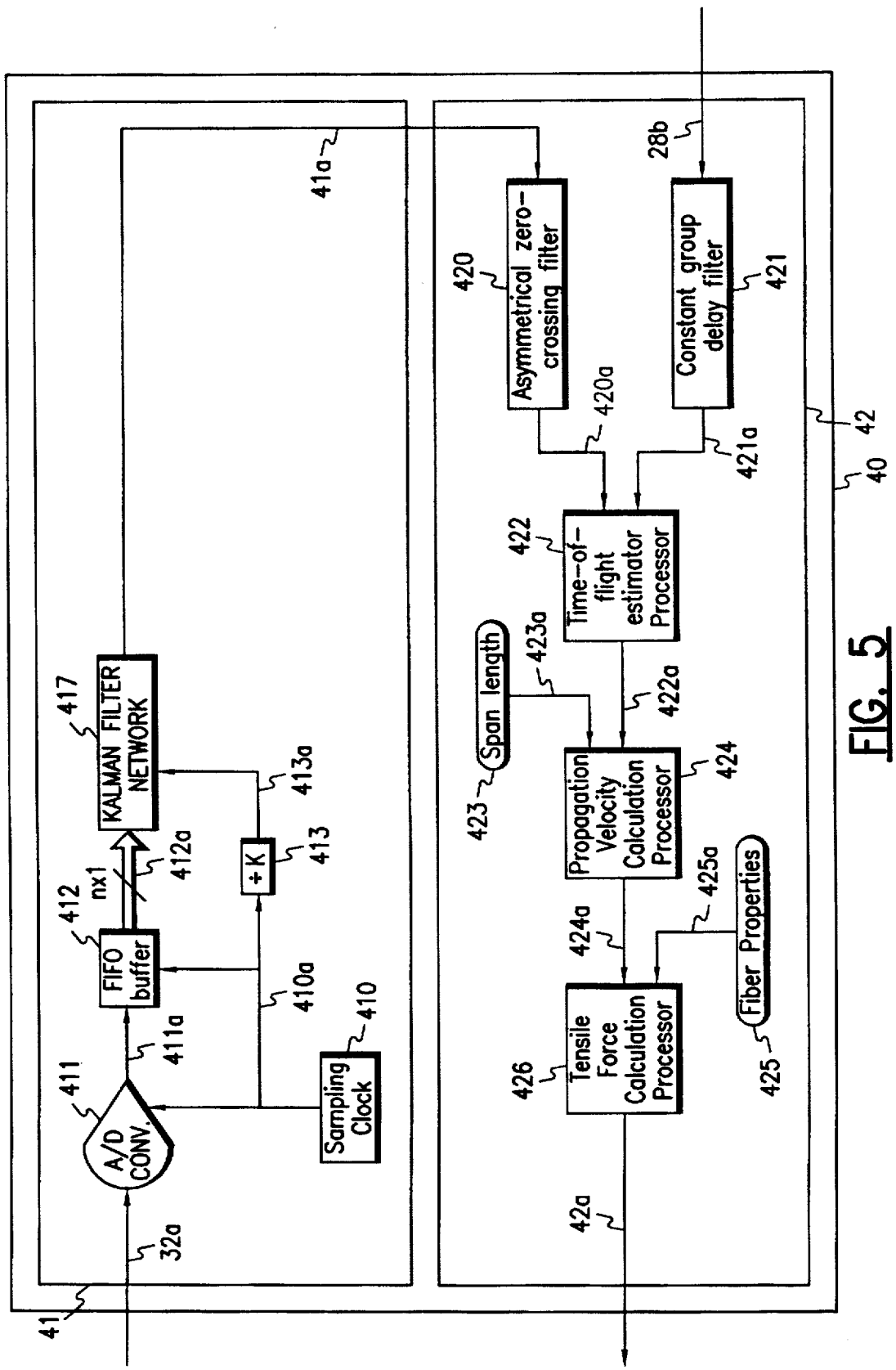
FIG. 5 shows an alternative embodiment of the present invention in which the traveling wave wavelet transformation and time-of-flight processor 40 has a Kalman filtering network.

In another embodiment shown in FIG. 5, the traveling wave wavelet transformation processor 41 includes a Kalman filter network 417 in lieu of the discrete wavelet transform processor 414, the wavelet basis optimization circuit 415, and the reconstruction circuit 416 used in the wavelet method shown in FIG. 3. The Kalman filter network 417 accurately models signal characteristics representing thresholds of polarity changes (zero-crossings) and enables a determination of propagation periods of the traveling wave and the reflection thereof. As shown, the Kalman filter network 417 responds to the n-bit by 1 sample first-in/first-out buffer signal 412a and the sampling clock divider signal 413a, for providing the traveling wave wavelet transformation processor signal 41a in the form of a Kalman filter network signal. Such a Kalman filter network 417 is known in the art, and the scope of the invention is not intended to be limited to any particular implementation thereof.

The scope of the invention is also not intended to be limited to any particular wavelet transform, to any particular optimal filtering method, or to any signal processing method which accurately preserves the propagation period information content of the fiber transverse motion signals herein described.

The elegance of the wavelet analysis approach described herein lies in its ability to efficiently represent the asymmetry inherent in the fiber's transverse motion signal, which, as discussed above, results from the superposition of reflected disturbances propagating at different velocities with respect to a 'stationary' observer, namely the fiber transverse position sensor 30. The goal of the signal analyses shall be to accurately estimate the zero-crossings of the transverse motion signal and thus correctly identify the predicted asymmetric periods. The propagation period information can be similarly derived by matched or adaptive filtering techniques, including but explicitly not limited to Kalman filtering. The objective in all cases is to accurately estimate the respective wave propagation periods from a suitably conditioned transverse vibration signal.

The Time-of-Flight Fiber Tension Processor 42

As shown in FIG. 3, the time-of-flight fiber tension processor 42 responds to the traveling wave wavelet transformation processor signal 41a, and further responds to the fiber draw speed signal 28b, and provides the traveling wave wavelet transformation and time-of-flight fiber tension processor signal 42a.

The time-of-flight fiber tension processor 42 includes an asymmetric zero crossing filter 420 that responds to the traveling wave transformation processor signal 41a, and provides an asymmetric zero-crossing filter signal 420a indicative of filtered asymmetric zero-crossings of the traveling wave transformation processor signal 41a. A constant group delay filter 421 responds to the fiber draw speed signal 28b, and provides a constant group delay filter signal 421a indicative of a constant group delay filter. A time-of-flight estimation processor 422 responds to the asymmetric zero-crossing filter signal 420a, and further responds to the constant group delay filter signal 421a, and provides a time-of-flight estimation processor signal 422a indicative of an estimation of the time-of-flight of the traveling wave propagating in one direction along the moving fiber and the reflection of the traveling wave propagating back in the opposite direction along the moving fiber. A measured span length constant indicated as reference numeral 423 is provided as a span length constant signal 423 indicative of a measured constant, determined after a typical fiber drawing system is erected and configured. The span length constant signal 423a is indicative of a bounded span length of the fiber, typically a distance measured from the preform root to a point at which the fiber is in contact with the coating liquid within the first coating applicator 18. A propagation velocity calculation processor 424 responds to the time-of-flight estimation processor signal 422a, and further responds to the span length constant signal 423a, and provides a propagation velocity calculation processor signal 424a indicative of a propagation velocity of the traveling wave propagating in one direction along the moving fiber and the reflected traveling wave propagating back in the opposite direction along the moving fiber. A fiber property constant is indicated as 425 and is provided as a fiber property constant signal 425a indicative of at least one fiber property constant of the fiber being drawn. This shall be taken to be the mass per unit length (also called the linear density) of the fiber, and a nominal value is used, which assumes a known uniform diameter. A fiber tensile force calculation processor 426 responds to the propagation velocity calculation processor signal 424a, and further responds to the fiber property constant signal 425a, and provides the time-of-flight fiber tension processor signal 42a. For example, the asymmetric zero-crossing filter 420, the time-of-flight estimation processor 422, the propagation velocity calculation processor 424 and the fiber tensile force calculation processor 426 may be implemented as microprocessor software using a standard microprocessor architecture, including a microprocessor, a read only memory (ROM), a random access memory (RAM), and a standard data and address bus for connecting these components, which are all known in the art. The mathematics of the wavelet analysis for such processors are known in the art. The scope of the invention is not intended to be limited to either any particular type implementation of the asymmetric zero-crossing filter 420, the constant group delay filter 421, the time-of-flight estimator 422, the propagation velocity calculation processor 424, the fiber tensile force calculation processor 426, all of which can be implemented using hardware, software, or any combination thereof.

In the embodiment shown in FIG. 5, the time-of-flight fiber tension processor 42 responds to the traveling wave wavelet transformation processor signal 41a in the form of the Kalman filtering network signal, and further responds to the fiber draw speed signal 28b, and provides the traveling wave wavelet transformation and time-of-flight fiber tension processor signal 42a, in a manner similar to that described above with respect to the embodiment shown in FIG. 3.

The Fiber Tension Readout and Controller 43

The optical fiber producing apparatus 10 also includes a fiber tension readout and controller 43 that responds to the time-of-flight fiber tension processor signal 42a, and provides a fiber tension controller signal 43a indicative of a controller information about the fiber tension and a visual readout thereof. The fiber tension readout and controller 43 is known in the art. The scope of the invention is not intended to be limited to any particular implementation of the fiber tension readout and controller 43, which may be implemented using hardware, software, or any combination thereof.

The Controllable Drawing Furnace Power Source 11

The optical fiber producing apparatus 10 also includes a controllable drawing furnace power source 11, responsive to the fiber tension controller signal 43a, for controlling the drawing furnace. The controllable drawing furnace power source 11 is known in the art.

Figure 4:
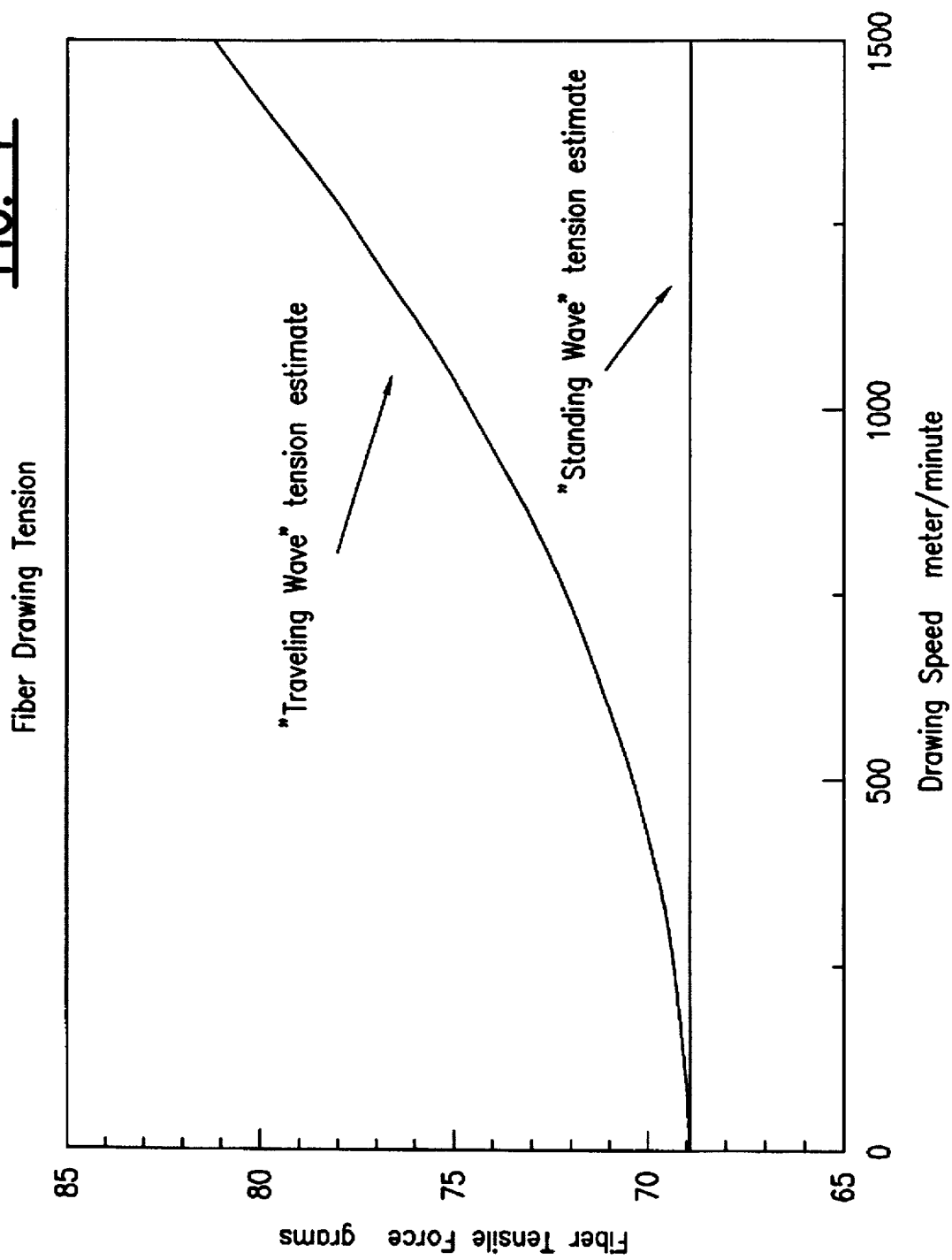
FIG. 4 shows a graph of draw speed in meters/second versus fiber tensile force in grams.

Discussion of Graph of Fiber Draw Tension in FIG. 4

FIG. 4 is a graph comparing the fiber drawing tension as estimated by both the conventional 'standing wave' method taught by U.S. Pat. No. 4,692,615 and the 'traveling wave' method taught by the present application, using the same fiber transverse motion signal in both cases. The graph presents a typical error behavior of the 'standing wave' tension estimator as a function of the drawing speed, computed for the conditions present while drawing a typical monomode telecommunications optical fiber with a medium capacity drawing apparatus.

Possible Real Time Applications

The invention has applications is any real-time, non-contact measurement of tension in a moving belt or filament, such as: optical fiber drawing or winding; yarn, textile, or wire drawing or winding; polymer fiber drawing; ribbon manufacturing or winding; carbon fiber manufacturing or winding; real time belt (web) tension monitoring.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical fiber producing apparatus having non-contact fiber tension monitoring, comprising:

a traveling wave wavelet transformation processor, responsive to a fiber transverse position processor signal representing information relating to a traveling wave propagating in one direction along a moving fiber and a reflection of the traveling wave propagating back in an opposite direction along the moving fiber, for providing a traveling wave wavelet transformation processor signal; and a time-of-flight fiber tension processor, responsive to the traveling wave wavelet transformation processor signal, and further responsive to a fiber draw speed signal, for providing a time-of-flight fiber tension processor signal indicative of a fiber tension of the moving fiber using traveling wave time-of-flight analysis.

2. An optical fiber producing apparatus according to claim 1, wherein the traveling wave wavelet transformation processor includes a discrete wavelet transform processor that uses wavelet transformations for optimizing a wave shape of a superposition of a disturbance and an associated reflection such that propagation periods of the traveling wave determine both the disturbance and the associated reflection.

3. An optical fiber producing apparatus according to claim 1, wherein the traveling wave wavelet transformation processor further comprises:

a sampling clock for providing a sampling clock signal;

an analog-to-digital converter, responsive to the sampling clock signal, for providing an analog-to-digital converter sensed traveling wave signal;

a first-in/first-out buffer, responsive to the sampling clock signal, and further responsive to the analog-to-digital converter sensed traveling wave signal, for providing a first-in/first-out buffer signal;

a sampling clock divider circuit, responsive to the sampling clock signal, for providing a sampling clock divider signal;

a discrete wavelet transform processor, responsive to the first-in/first-out buffer signal, and further responsive to the sampling clock divider signal, for providing a discrete wavelet transform processor signal;

a wavelet basis optimization processor, responsive to the discrete wavelet transform processor signal, for providing a wavelet basis optimization processor signal; and a reconstruction processor, responsive to the wavelet basis optimization processor signal, for providing the traveling wave wavelet transformation processor signal in the form of a reconstruction processor signal.

4. An optical fiber producing apparatus according to claim 1, wherein the time-of-flight fiber tension processor further comprises:

a time-of-flight estimation processor for determining a time-of-flight of the traveling wave propagating in the one direction along the moving fiber and the reflection of the traveling wave propagating back in the opposite direction along the moving fiber; and a propagation velocity calculation processor for determining a propagating velocity of the traveling wave propagating in the one direction along the moving fiber and the reflection of the traveling wave propagating back in the opposite direction along the moving fiber.

5. An optical fiber producing apparatus according to claim 1, wherein the time-of-flight fiber tension processor further comprises:

an asymmetric zero-crossing filter, responsive to the traveling wave transformation processor signal, for providing an asymmetric zero crossing filter signal;

a constant group delay filter, responsive to the fiber draw speed signal, for providing a constant group delay filter signal;

a time-of-flight estimation processor, responsive to the asymmetric zero-crossing filter signal, and further responsive to the constant group delay filter signal, for providing a time-of-flight estimation processor signal;

a propagation velocity calculation processor, responsive to the time-of-flight estimation processor signal, and further responsive to a span length constant signal indicative of a span length constant, for providing the time-of-flight traveling wave propagating velocity processor signal in the form of a propagation velocity calculation processor signal;

a fiber tensile force calculation processor, responsive to the propagation velocity calculation processor signal, and further responsive to a fiber property signal indicative of at least one fiber property, for providing a fiber tensile force calculation processor signal indicative of a fiber tensile force of a fiber being drawn.

6. An optical fiber producing apparatus according to claim 1, further comprising:

a fiber tension readout and controller, responsive to the time-of-flight fiber tension processor signal, for providing a fiber tension readout and controller signal.

7. An optical fiber producing apparatus according to claim 5, further comprising:

a controllable drawing furnace power source, responsive to the fiber tensile force calculation signal, for controlling the drawing furnace.

8. An optical fiber producing apparatus according to claim 1, further comprising:

a fiber transverse position sensor, responsive to transverse motion of the traveling wave propagating in the one direction along the moving fiber and the reflection of the traveling wave propagating back in the opposite direction along the moving fiber, for providing a fiber transverse position sensor signal.

9. An optical fiber producing apparatus according to claim 8, further comprising:

a fiber transverse position processor, responsive to the fiber transverse position sensor signal, for providing the fiber transverse position processor signal.

10. An optical fiber producing apparatus according to claim 1, wherein the traveling wave wavelet transformation processor includes a Kalman filter network for modeling signal characteristics representing thresholds of polarity changes (zero-crossings), and enabling a determination of the propagation periods of the traveling wave.

11. An optical fiber producing apparatus according to claim 1, wherein the traveling wave wavelet transformation processor further comprises:

a sampling clock for providing a sampling clock signal;

an analog-to-digital converter, responsive to the sampling clock signal, for providing an analog-to-digital converter sensed traveling wave signal;

a first-in/first-out buffer, responsive to the sampling clock signal, and further responsive to the analog-to-digital converter sensed traveling wave signal, for providing a first-in/first-out buffer signal;

a sampling clock divider circuit, responsive to the sampling clock signal, for providing a sampling clock divider signal; and a Kalman filter network, responsive to the first-in/first-out buffer signal, and further responsive to the sampling clock divider signal, for providing the traveling wave wavelet transformation processor signal in the form of a Kalman filter network signal.

* * * * *

UNITED STATES PATENT AND TRADEMARK OFFICE
CERTIFICATE OF CORRECTION

PATENT NO. : 5,710,432
DATED : January 20, 1998
INVENTOR(S) : David G. Bell

It is certified that error appears in the above-identified patent and that said Letters Patent is hereby corrected as shown below:

On the title page, Item [56]:

Under References Cited, U.S. Patent Documents, Miller et al., please delete "73/562.41" and insert --73/862.41--.

Signed and Sealed this

Fifteenth Day of September, 1998

*Attest:*

BRUCE LEHMAN

*Attesting Officer*  Commissioner of Patents and Trademarks